(12) United States Patent
Jang

(10) Patent No.: US 7,528,411 B2
(45) Date of Patent: May 5, 2009

(54) DISPLAY PANEL AND METHOD OF MANUFACTURING THE SAME

(75) Inventor: Min Sok Jang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 558 days.

(21) Appl. No.: 11/250,579

(22) Filed: Oct. 17, 2005

(65) Prior Publication Data

US 2006/0081853 A1 Apr. 20, 2006

(30) Foreign Application Priority Data

Oct. 18, 2004 (KR) ............... 10-2004-0083154

(51) Int. Cl.
*H01L 27/14* (2006.01)
(52) U.S. Cl. .......................... 257/72; 257/758
(58) Field of Classification Search ............ 257/72, 257/758
See application file for complete search history.

(56) References Cited

U.S. PATENT DOCUMENTS 7,133,095 B2 * 11/2006 Kang ................. 349/114

FOREIGN PATENT DOCUMENTS

| JP | 2002-341354 | 11/2002 |
|----|-------------|---------|
| JP | 2003-121857 | 4/2003 |
| KR | 2004-0026801 | 4/2004 |

* cited by examiner

*Primary Examiner*—Douglas M Menz
(74) *Attorney, Agent, or Firm*—F. Chau & Associates, LLC.

(57) ABSTRACT

A display panel and a method for manufacturing the display device having the display pixel, includes forming a first substrate with pixel areas and a second substrate facing the first substrate. The second substrate includes a color filter layer having a first region and a second region that is arranged lower than the first region. A first member is arranged in the first region between the first substrate and the second substrate to maintain a cell gap between the first substrate and the second substrate. The second cell gap-maintaining member is arranged in the second region between the first substrate and the second substrate to absorb an external force being applied to the first substrate and the second substrate.

11 Claims, 9 Drawing Sheets

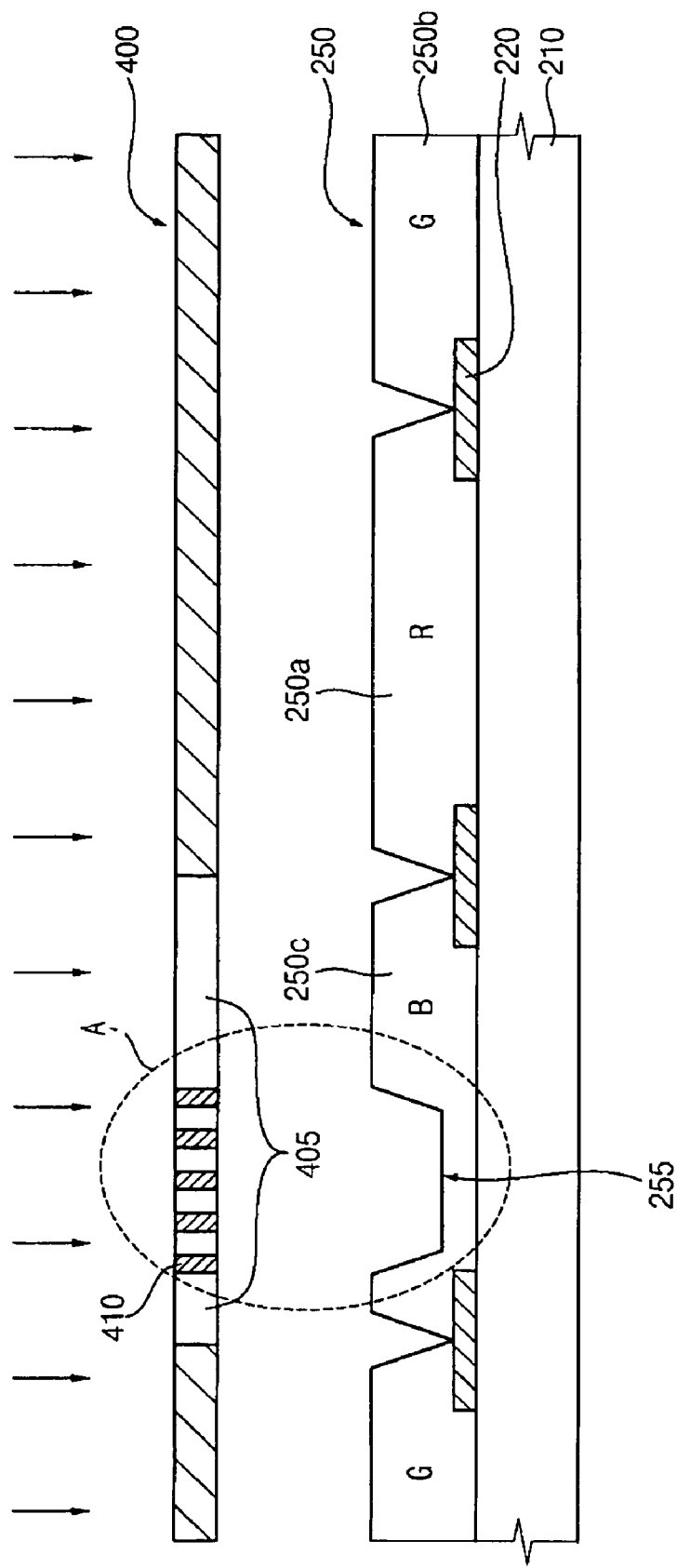

DISPLAY PANEL AND METHOD OF MANUFACTURING THE SAME

CROSS REFERENCE TO RELATED APPLICATION

This application claims priority to and the benefit of Korean Patent Application No. 10-2004-0083154 filed on Oct. 18, 2004, which is hereby incorporated by reference for all purposes as if filly set forth herein.

BACKGROUND OF THE INVENTION

1. Field of the Invention

The present invention relates to a display panel and a method for manufacturing the display panel. More particularly, the present invention relates to a display device capable of improving a margin of a dropping process and preventing a smear damage caused by an external force applied to the display panel and to a method for manufacturing the display device.

2. Description of the Related Art

A liquid crystal display device includes a thin film transistor (TFT) substrate, a color filter substrate and a liquid crystal display panel. The color filter substrate faces the TFT substrate. The liquid crystal display panel is positioned between the thin film transistor (TFT) and the color filter substrate. The liquid crystal display panel includes a liquid crystal selectively transmitting a light in response to an electrical signal applied thereto. A light transmittance of the liquid crystal may be varied. However, the liquid crystal positioned between the thin film transistor (TFT) and the color filter substrate may not be self emitting. Thus, it may be necessary for the liquid crystal display device to have a light source, e.g., a lamp generating a light for displaying an image.

The liquid crystal is positioned in a cell gap between the TFT substrate and the color filter substrate. Column spacers positioned over the color filter substrate may uniformly maintain the cell gap.

The liquid crystal may be positioned in the cell gap according to various methods. One of the methods is a dropping process where liquid crystal is dropped onto either the TFT substrate or the color filter substrate. The color filter substrate and the TFT substrate are then only slightly combined with each other in a vacuum chamber. Seal lines positioned along edges of the color filter substrate and the TFT substrate are then hardened so that the color filter substrate is firmly combined with the TFT substrate.

However, the liquid crystal that is dropped onto the TFT substrate or the color filter substrate may not be uniformly dispersed, which may result in a decrease of a margin of the dropping process. To improve the margin of the dropping process, it has been suggested that a volume of the column spacer be reduced.

However, when reducing the volume of the column spacer, an external force is applied to the TFT substrate or the color filter substrate and the cell gap is not uniformly maintained, resulting in a smear damage.

Thus, to constantly maintain the cell gap and prevent the smear damage, it has been suggested to use a sub column spacer with a main column spacer.

The main column spacer and the sub column spacer may have different heights.

The difference in height between the main column spacer and the sub column spacer is obtained by a complex processes.

SUMMARY OF THE INVENTION

The present invention provides a color filter substrate that improves a margin of a dropping process and prevents a smear damage, a display panel having the color filter substrate, a method for manufacturing the color filter substrate, and a method for manufacturing the display panel.

Additional features of the invention will be set forth in the description which follows, and in part will be apparent from the description, or may be learned by practice of the invention.

The present invention discloses a color filter layer provided on a substrate including a color filter layer including a first region and a second region arranged lower than the first region; a first member arranged over the first region to maintain a cell gap; a second member arranged over the second region to maintain the cell gap.

The present invention also discloses a display panel, including a first substrate having pixel areas, a second substrate facing the first substrate, the second substrate including a color filter layer having a first region and a second region arranged lower than the first region, a first member arranged in the first region between the first substrate and the second substrate to maintain a cell gap between the first substrate and the second substrate, and a second cell gap-maintaining member arranged in the second region between the first substrate and the second substrate to absorb an external force being applied to the first substrate and the second substrate.

The present invention also discloses a method of manufacturing a color filter substrate; including forming a color filter layer on a substrate, the color filter layer including a first region and a second region that is arranged lower than the first region; and forming a first member over the first region to maintain a cell gap; and forming a second member over the second region to maintain the cell gap.

The present invention also discloses a method of manufacturing a display device, the method including forming a first substrate; forming a second substrate facing the first substrate, the second substrate including a color filter layer having a first region and a second region that is arranged lower than the first region; forming a first member in the first region between the first substrate and the second substrate to maintain a cell gap between the first substrate and the second substrate; and forming a second member in the second region between the first substrate and the second substrate to absorb an external force being applied to the first substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIGS. 4a, 4b, 4c, and 4d are cross-sectional views showing a method of manufacturing the lower substrate shown in FIG. 1.

DESCRIPTION OF THE ILLUSTRATED EMBODIMENTS

Figure 1:
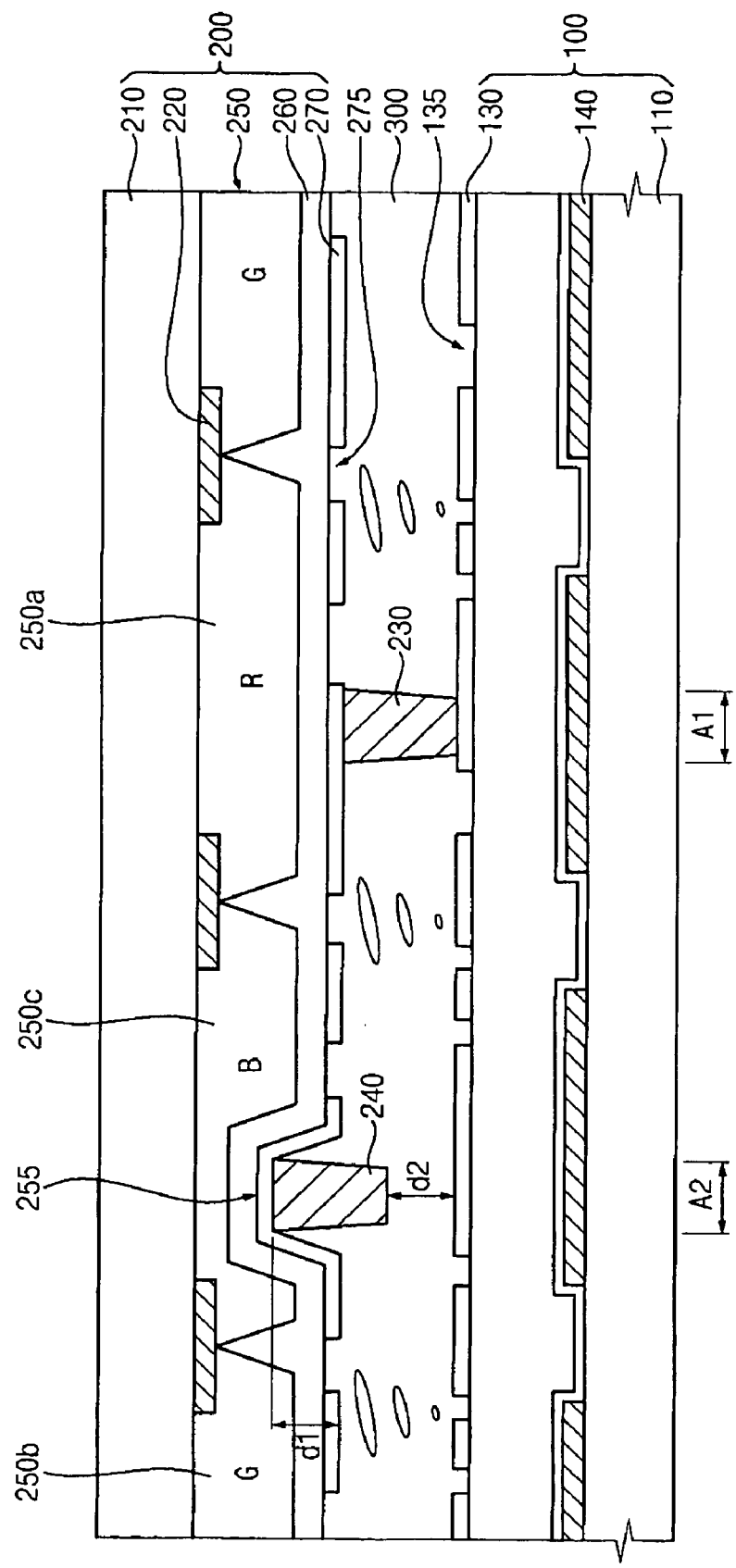
FIG. 1 is a cross-sectional view showing a liquid crystal display panel (LCD) according to an embodiment of the invention.

The invention is described more fully hereinafter with reference to the accompanying drawings, in which embodiments of the invention are shown. This invention may, however, be embodied in many different forms and shall not be construed as limited to the embodiments set forth herein. Rather, these embodiments are provided so that this disclosure is thorough, and conveys the scope of the invention to those skilled in the art. In the drawings, the size and relative sizes of layers and regions may be exaggerated for clarity.

It will be understood that when an element or layer is referred to as being "on", "connected to" or "coupled to" another element or layer, the element or layer can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout.

Figure 2:
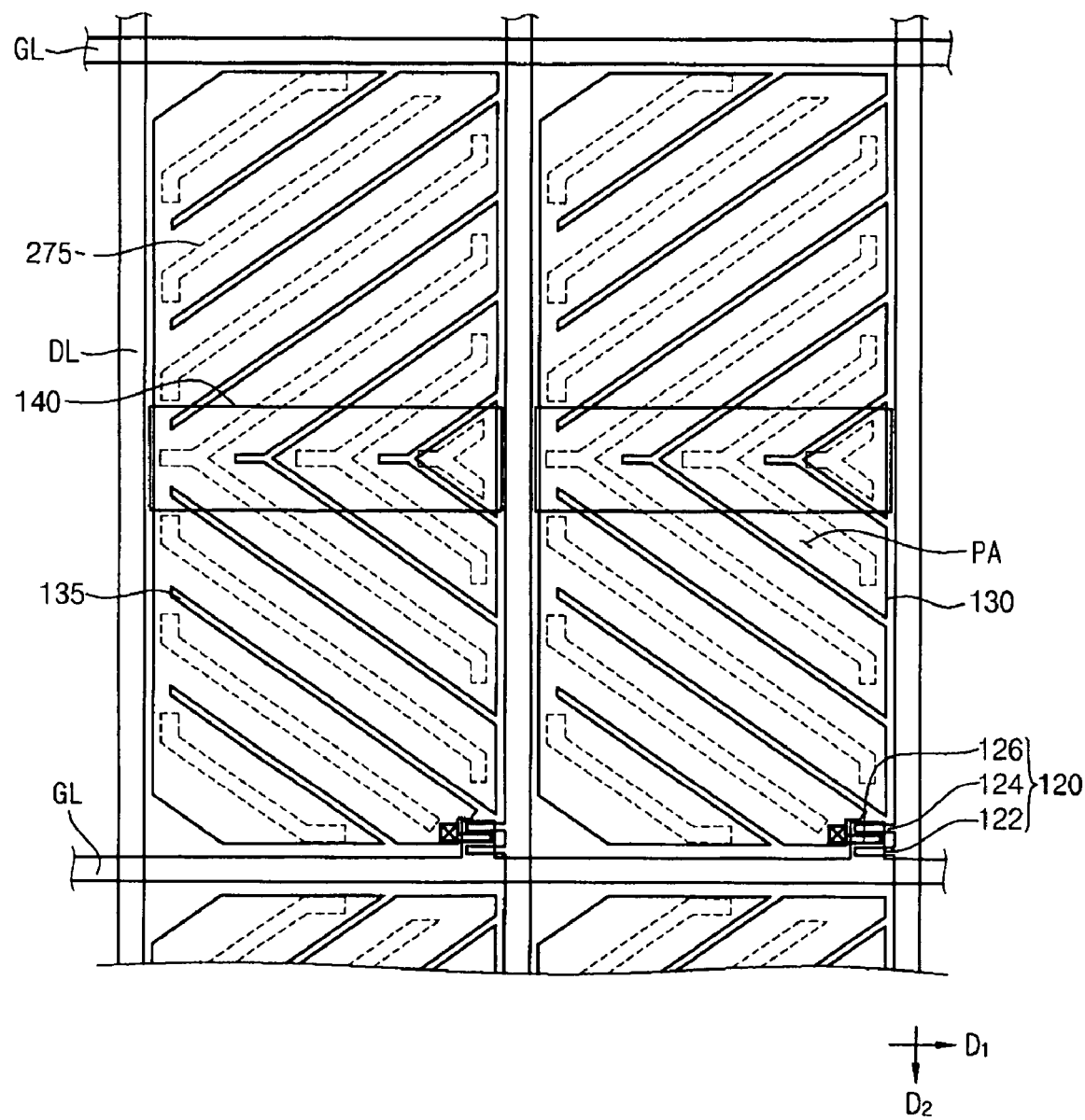
FIG. 2 is a plan view showing a lower substrate shown in FIG. 1.
Figure 3:
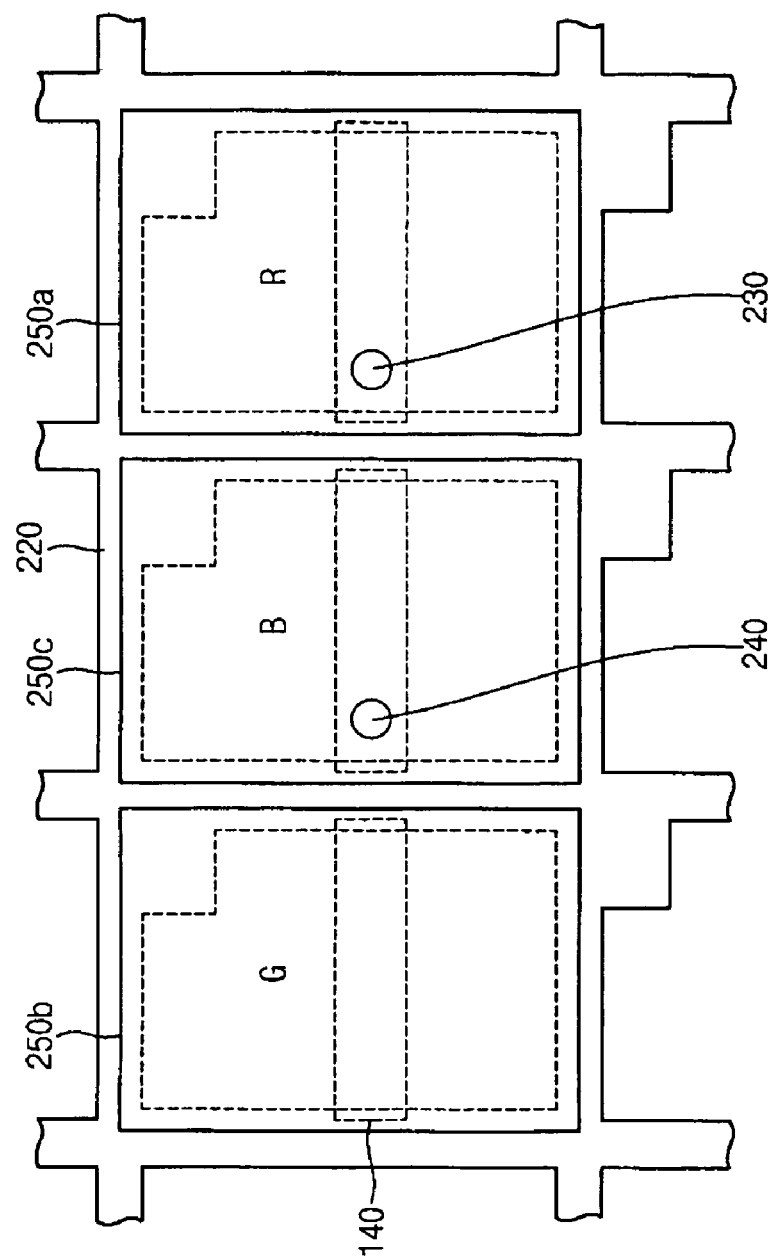
FIG. 3 is a plan view showing an upper substrate shown in FIG. 1.

FIG. 1 is a cross-sectional view showing a liquid crystal display (LCD) panel according to an embodiment of the invention. FIG. 2 is a plan view showing a lower substrate that is shown in FIG. 1. FIG. 3 is a plan view illustrating an upper substrate that is illustrated in FIG. 1.

Referring to FIGS. 1, 2, and 3, a liquid crystal display panel includes a lower substrate 100, an upper substrate 200 and a liquid crystal layer 300 arranged therebetween.

The lower substrate 100 includes a plurality of pixel areas (PA). The pixel areas (PA) are defined by a plurality of gate lines (GL) and a plurality of data lines (DL). Each of the gate lines (GL) extends in a first direction (D1). Each of the data lines (DL) extends in a second direction (D2) that is substantially perpendicular to the first direction (D1).

In each of the pixel areas (PA), the lower substrate 100 includes a thin film transistor (TFT) 120 and a pixel electrode pattern 130. The thin film transistor (TFT) 120 is positioned on a first substrate 110. The pixel electrode pattern 130 is positioned over the thin film transistor (TFT) 120. A gate electrode 122 of the thin film transistor (TFT) 120 extends from the gate line (GL). A source electrode 124 extends from the data line (DL). A drain electrode 126 is electrically connected, e.g., coupled with the pixel electrode pattern 130. Thus, the thin film transistor.(TFT) 120 outputs a data signal to the pixel electrode pattern 130 in response to a gate signal.

A storage line 140 that forms a storage capacitor (Cst) is positioned at substantially a central portion of the pixel area (PA). The storage capacitor (Cst) maintains an electrical signal applied to the liquid crystal layer 300 at a predetermined time. The storage line 140 extends in a direction that is substantially parallel with the gate line (GL). The storage line 140 may be a lower electrode of the storage capacitor (Cst). In addition, a portion of the pixel electrode pattern 130 that corresponds with the storage line 140 may be an upper electrode of the storage capacitor (Cst).

An upper substrate 200 includes a second substrate 210, a light-blocking layer 220, a first cell gap-maintaining member 230, a second cell gap-maintaining member 240, a color filter layer 250, an over-coated layer 260 and a common electrode pattern 270. The light-blocking layer 220, the first cell gap-maintaining member 230, the second cell gap-maintaining member 240, the color filter layer 250, the over-coated layer 260 and the common electrode pattern 270 are positioned below the second substrate 210.

The common electrode pattern 270 faces the pixel electrode pattern 130 of the lower substrate 100. The pixel electrode pattern 130, the common electrode pattern 270 and the liquid crystal layer 300 together determine a liquid crystal capacity. A pixel electrode layer pattern (not shown) and a common electrode layer pattern (not shown) are patterned such that the pixel electrode pattern 130 and the common electrode pattern 270 have predetermined shapes, enabling the pixel area (PA) to be divided into domains. For example, as shown in FIG. 1, a portion of the pixel electrode layer pattern 130 may be removed, e.g., the portion between the domains, creating a first opening portion 135 of the pixel electrode pattern 130. In addition, as shown in FIG. 1, a portion of the common electrode layer pattern 270 may be removed so that the common electrode pattern may have a second opening portion 275. Thus, liquid crystal molecules included in the liquid crystal layer may be vertically arranged in a direction different from each other according to the domains of the liquid crystal layer.

The light-blocking layer 220 arranged between the pixel areas PA so that the light-blocking layer 220 may surround each of the pixel areas PA. The light-blocking layer 220 may prevent a light from leaking between the pixel areas PA. In addition, the light-blocking layer 220 may prevent the TFT 120, the gate line (GL) and the data line (DL) from being projected on a screen of the LCD panel.

The first cell gap-maintaining member 230 and the second cell gap-maintaining member 240 correspond to the storage line 140 of the lower substrate 100. The first cell gap-maintaining member 230 and the second cell gap-maintaining member 240 have cylindrical shapes with diameters increasing toward the common electrode pattern 270. The first cell gap-maintaining member 230 is referred below to as a first column spacer and the second cell gap-maintaining member 240 is referred to below as a second column spacer.

The first column spacer 230 is a main column spacer maintaining a cell gap between the lower substrate 100 and the upper substrate 200. The second column spacer 240 is a sub column spacer dispersing an external force applied to the liquid crystal display panel to prevent a smear damage. The first column spacer 230 has substantially of the same height as the second column spacer 240.

The color filter layer 250 is arranged on the second substrate 210 having the light-blocking layer 220 positioned therebeneath. The color filter layer 250 includes color pixels such as a red (R) color pixel 250a, a green (G) color pixel 250b and a blue (B) color pixel 250c. The color pixel may be formed by patterning a negative photoresist pattern. Alternatively, the color pixel may be formed by patterning a positive photoresist pattern.

As shown in FIG. 1, the color filter layer 250 may include a first area (A1) and a second area (A2). The first column spacer 230 corresponds to the first area (A1). The second column spacer 240 corresponds to the second area (A2). In addition, the first area (A1) and the second area (A2) correspond with the storage line 140.

A portion of the blue (B) color pixel 250c, the portion corresponding to the second area (A2), is removed to form a spacer recess 255. Alternatively, a portion of the red (R) color pixel 250a that corresponds with the second area (A2) may be removed to form a spacer recess 255. Alternatively, a portion of the green (G) color pixel 250b that corresponds with the second area (A2) may be removed to form a spacer recess 255.

The spacer recess 255 may be formed using a mask that has a slit pattern. For example, when the blue (B) color pixel 250c is formed by patterning a negative photoresist pattern, a small amount of light may be supplied to a first portion of the blue (B) color pixel 250c that corresponds with a center portion of the spacer recess 255, through the slit pattern. Alternatively, for example, a large amount of light may be supplied to a second portion of the blue (B) color pixel 250c that corresponds with to an edge of the spacer recess 255, through the slit pattern. Accordingly, more of the portion of the first area (A1) may be removed than the portion of the second area (A2) by a subsequent process.

As shown in FIG. 1, the second column spacer 240 is arranged below under the spacer recess 255 of the blue (B) color pixel 250c. The first column spacer 230 is arranged below the red (R) color pixel 250a.

As described above, the spacer recess 255 may be arranged below the blue (B) color pixel 250c. Alternatively, the spacer recess 255 may be arranged below the red (R) color pixel 250a or the green (G) color pixel 250b.

As shown in FIG. 1, the first column spacer 230 is arranged below the red (R) color pixel 250a. Alternatively, the first column spacer 230 may be arranged below the blue (B) color pixel 250c or the green (G) color pixel 250b.

As described above, the first column spacer 230 and the second column spacer 240 may be independently positioned under different color pixels. For example, the color pixels may be adjacent to each other or both the first column spacer 230 and the second column spacer 240 may be positioned under one color pixel.

The over-coated layer 260 is arranged below the color filter layer 250. The over-coated layer 260 may have a uniform thickness. The common electrode pattern 270 is arranged under the over-coated layer 260. The common electrode pattern 270 may have a uniform thickness. The common electrode pattern 270 may include indium tin oxide (ITO) or indium zinc oxide (IZO), alone or in a mixture thereof. The spacer recess 255 may enable a first portion of the common electrode pattern 270 that corresponds with the first area (A1) where the first column spacer 230 is arranged, to have a greater height, e.g., positioned further from the pixel electrode pattern, than the height of a second portion of the common electrode pattern 270 that corresponds with the second area (A2) where the second column spacer 240 is arranged.

As previously described, the over-coated layer 260 and the common electrode pattern 270 that are sequentially arranged below the color filter layer 250 have a substantially uniform thickness. Thus, there exists a first difference (d1) in height of the over-coated layer 260 and the common electrode pattern 270 between the first area (A1) where the first column spacer 230 is arranged and the second area (A2) where the second column spacer 240 is arranged.

There is a second difference (d2) in height between the first column spacer 230 positioned in the first area (A1) and the second column spacer 240 positioned in the second area (A2). The second difference (d2) in height may be substantially identical to the first difference (d1) in height.

As described, there is a difference in height between the first column spacer 230 and the second column spacer 240. Therefore, when the lower substrate 100 and the upper substrate 200 are combined, the first column spacer 230 may contact the pixel electrode pattern 130 of the lower substrate 100 and the second column spacer 240 may not contact the pixel electrode pattern 130 of the lower substrate 100. The height of the space between the second column spacer 240 and the pixel electrode pattern 230 may be substantially identical to the second difference (d2) in height.

The first column spacer 230 enables a cell gap between the lower substrate 100 and the upper substrate 200 to be substantially uniform. The second column spacer 240 enables an external force being applied to the liquid crystal display panel to be efficiently dispersed.

Thus, the first column spacer 230 and the second column spacer 240 together uniformly maintain the cell gap between the lower substrate 100 and the upper substrate 200, which improves a margin of a dropping process and substantially prevents a smear damage.

FIGS. 4A, 4B, 4C, and 4D are cross-sectional views showing a method of manufacturing the lower substrate in FIG. 1.

Figure 4A:
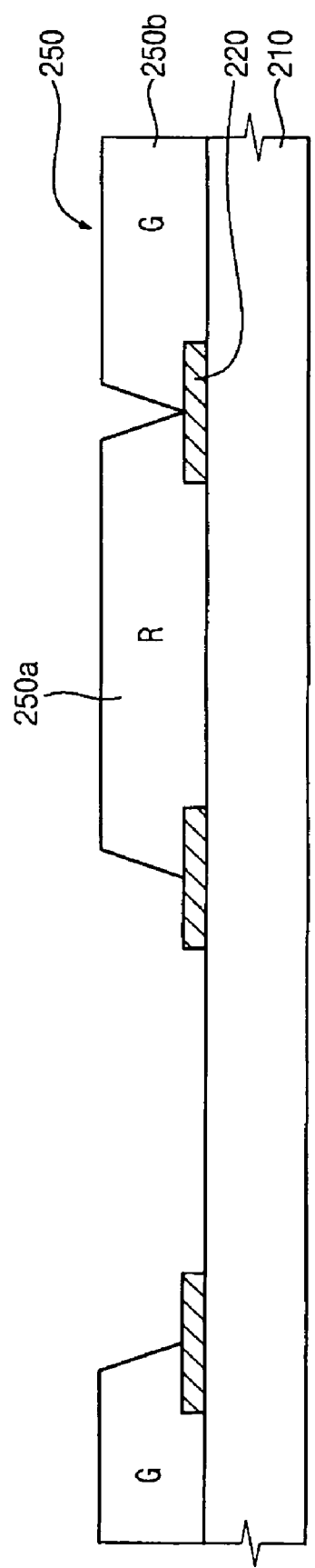

In FIG. 4A, a preliminary light-blocking layer (not shown) is arranged on a second substrate 210. The preliminary light-blocking layer is patterned to form a light-blocking layer 220. The light-blocking layer 220 may include an organic insulation material or an inorganic insulation material. The organic insulation material and inorganic insulation material may be used alone or in a mixture thereof.

Subsequently, a first photoresist (not shown) including a colored dye, e.g., red dye and/or a red pigment, is substantially uniformly applied on the second substrate 210 when the light-blocking layer 220 is formed. The first photoresist is then patterned to form a color pixel, e.g., a red (R) color pixel 250a.

Thereafter, a second photoresist (not shown) including a different colored dye, e.g., a green dye and/or a green pigment, is substantially uniformly applied on the second substrate 210 when the light-blocking layer 220 is formed. The second photoresist is then patterned to form a different color pixel, e.g., green (G) color pixel 250b.

Referring to FIG. 4B, a third photoresist (not shown) including yet another colored dye; e.g., a blue dye and/or a blue pigment, is applied on the second substrate 210 when the light-blocking layer 220 is formed. A first mask 400 is formed on the second substrate 210 on which the third photoresist is formed. The first mask 400 may include a first opening portion 405 and a slit pattern 410. The first opening portion 405 is used for forming a blue (B) color pixel 250c. The slit pattern 410 is used for forming a spacer recess 255. The slit pattern 410 is positioned over a second area (A2) where the second column spacer 240 is formed.

Figure 5:
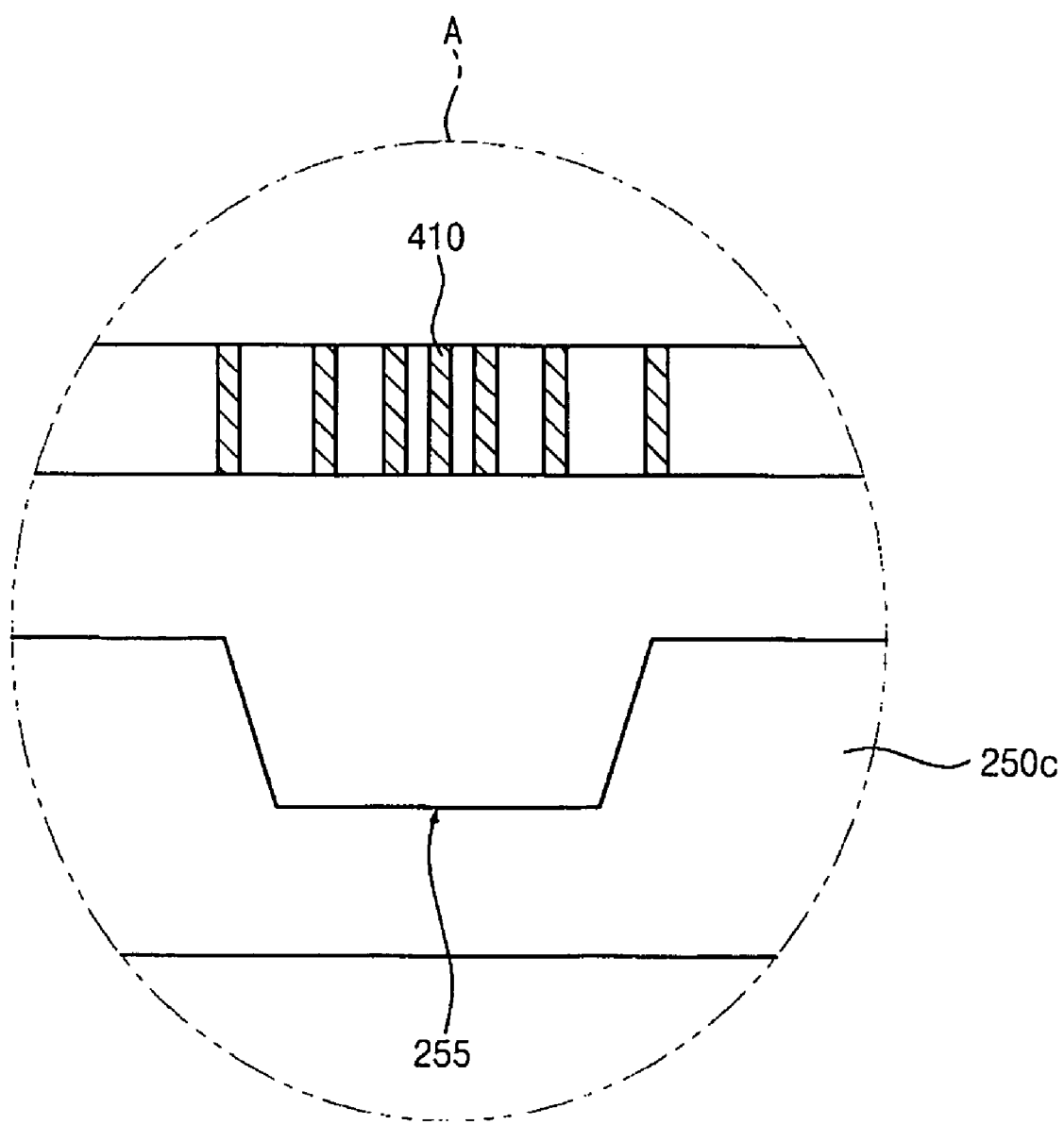
FIG. 5 is an enlarged partial cross-sectional view showing an "A" portion shown in FIG. 4b.

FIG. 5 is an enlarged cross-sectional view showing an "A" portion shown in FIG. 4B.

As shown in FIG. 5, first critical dimensions of a central portion of the slit pattern 410 are substantially less than second critical dimensions of an edge portion of the slit pattern 410. A large amount of light may be transmitted to the blue (B) color pixel through the central portion of the slit pattern 410 and a small amount of light may be transmitted to the blue (B) color pixel through the edge portion of the slit pattern 410.

Referring again to FIG. 4B, the third photoresist is partially exposed using the first mask 400. The third photoresist is etched using a predetermined etching solution. Thus, a portion of the third photoresist where a large amount of light is supplied through the first opening portion 405 is formed as the blue (B) color pixel 250c.

A small amount of light may be supplied to a first portion of the third photoresist, the first portion being positioned below the central portion of the slit pattern 410, through the central portion of the slit pattern 410. Thus, the first portion of the third photoresist pattern is partially removed to form a central portion of the spacer recess 255.

A substantially large amount of light may be supplied to a second portion of the third photoresist, the second region being positioned below the edge portion of the slit pattern 410, through the edge portion of the slit pattern 410. Thus, less of the second portion of the third photoresist pattern is partially removed than the first portion to form an edge portion of the spacer recess 255. The edge portion of the spacer recess 255 may be slanted with respect to a bottom portion. As a result, the spacer recess 255 is formed at a surface portion of the blue (B) color pixel 250c.

Figure 4C:
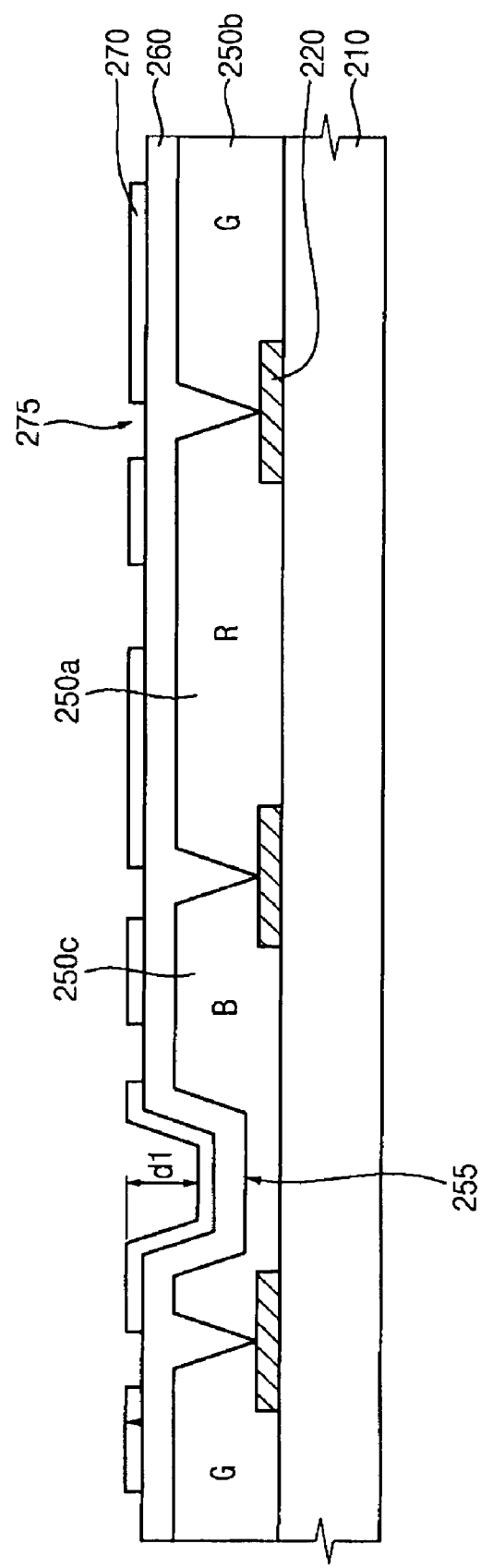

Referring to FIG. 4C, an over-coated layer 260 is substantially uniformly applied on the second substrate 210 where a color filter layer 250 including the red (R) color pixel 250a, the green (G) color pixel 250b and the blue (B) color pixel 250c arranged. The color filter layer 250 includes the spacer recess 255. The over-coated layer 260 may include an acrylic resin or a polyamide resin. The over-coated layer 260 may be a type of photosensitive organic insulation layer. A transparent conductive layer is then substantially uniformly applied on the over-coated layer 260 to form a common electrode pattern facing a pixel electrode pattern 130 of a TFT substrate 100. The transparent conductive layer may include ITO or IZO.

As previously described, the over-coated layer 260 and the common electrode pattern 270 are substantially uniformly arranged on the color filter layer 250. There is a first difference (d1) in height between a second area (A2) where the spacer recess 255 is formed and a first area (A1) spaced apart from the second area (A2).

Figure 4D:
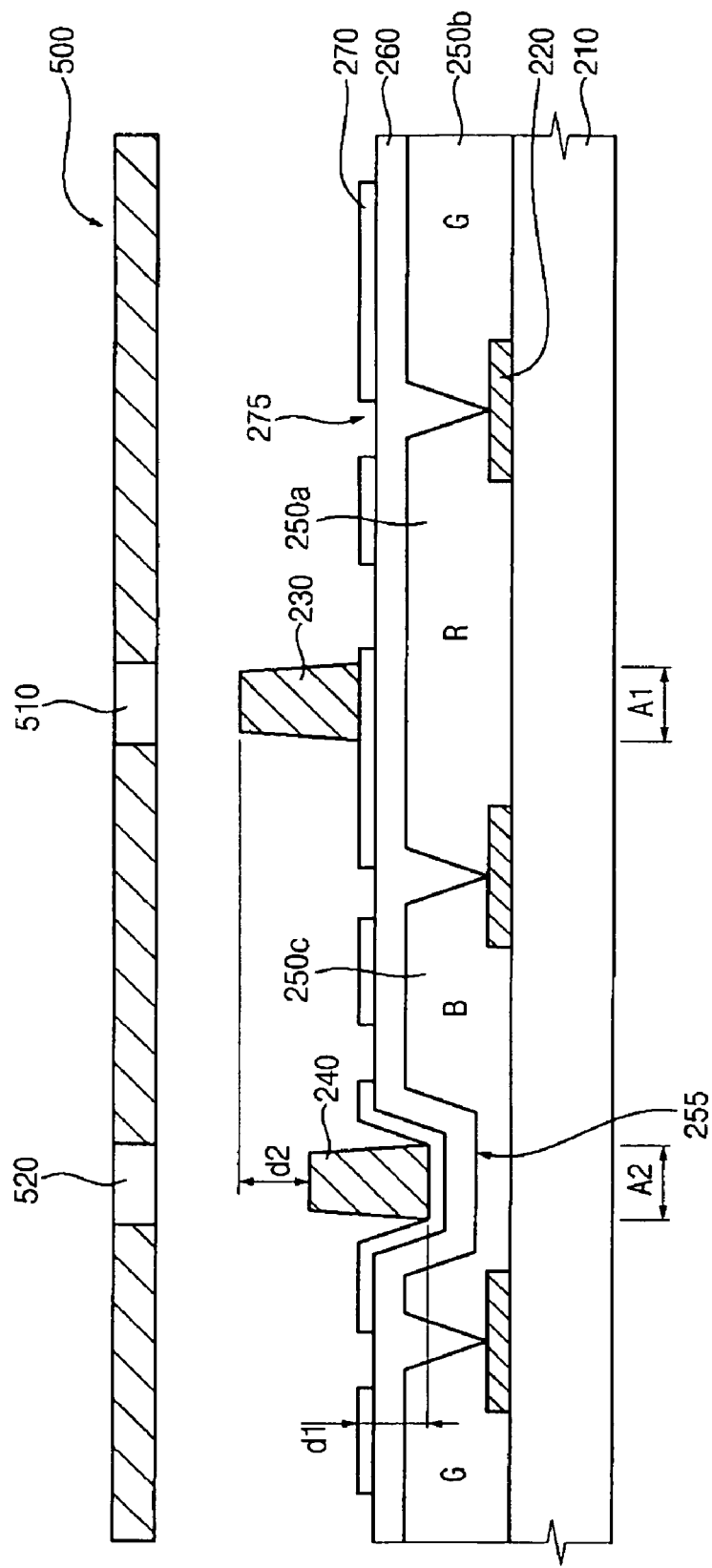

According to the embodiment shown in FIG. 4D, an organic layer (not shown) is substantially uniformly applied on the second substrate 210 where the common electrode pattern 270 is arranged. If the organic layer is a negative photoresist, a portion of the negative photoresist is exposed with a light and removed by a subsequent development process. Alternatively, if the organic layer is a positive photoresist, a portion of the positive photoresist is exposed with a light and preserved by a subsequent development process.

The organic layer is then patterned using a second mask 500 positioned over the organic layer provided on the second substrate 210 to form a first column spacer 230 and a second column spacer 240. The second mask 500 has a second opening portion 510 and a third opening portion 520. The second opening portion 510 corresponds with the first column spacer 230 and the third opening portion 520 corresponds with the second column spacer 240.

As previously described, the organic layer is exposed by the second opening portion 510 and the third opening portion 520 of the second mask 500. The organic layer is then developed to form the first column spacer 230 and the second column spacer 240. A width of the second opening portion 510 may be adjusted to form the first column spacer 230 having a predetermined height. A width of the first opening portion 520 may be adjusted to form the second column spacer 240 having a predetermined height.

The first area (A1) where the first column spacer 230 is positioned and the second area (A2) where the second column spacer 240 is positioned have the first difference (d1) in height; therefore, there is a second difference (d2) in height between the first column spacer 230 and the second column spacer 240. The second difference (d2) in height may be substantially identical to the first difference (d1) in height.

A method for forming the lower substrate 100 is well known in the art, therefore, further explanation thereof is not necessary.

A liquid crystal is dropped on the upper substrate 200 to form a liquid crystal layer. The lower substrate 100, which may be formed by a conventional method, is then combined with the upper substrate 200 to manufacture a LCD panel. Because there is the second difference (d2) in height between the first column spacer 230 and the second column spacer 240, the first column spacer 230 may contact the pixel electrode pattern 130 of the lower substrate 100 in the liquid crystal panel. On the other hand, the second column spacer 240 may be spaced apart from the pixel electrode pattern 130 of the lower substrate 100 by the second difference (d2) in the liquid crystal display panel.

Figure 6:
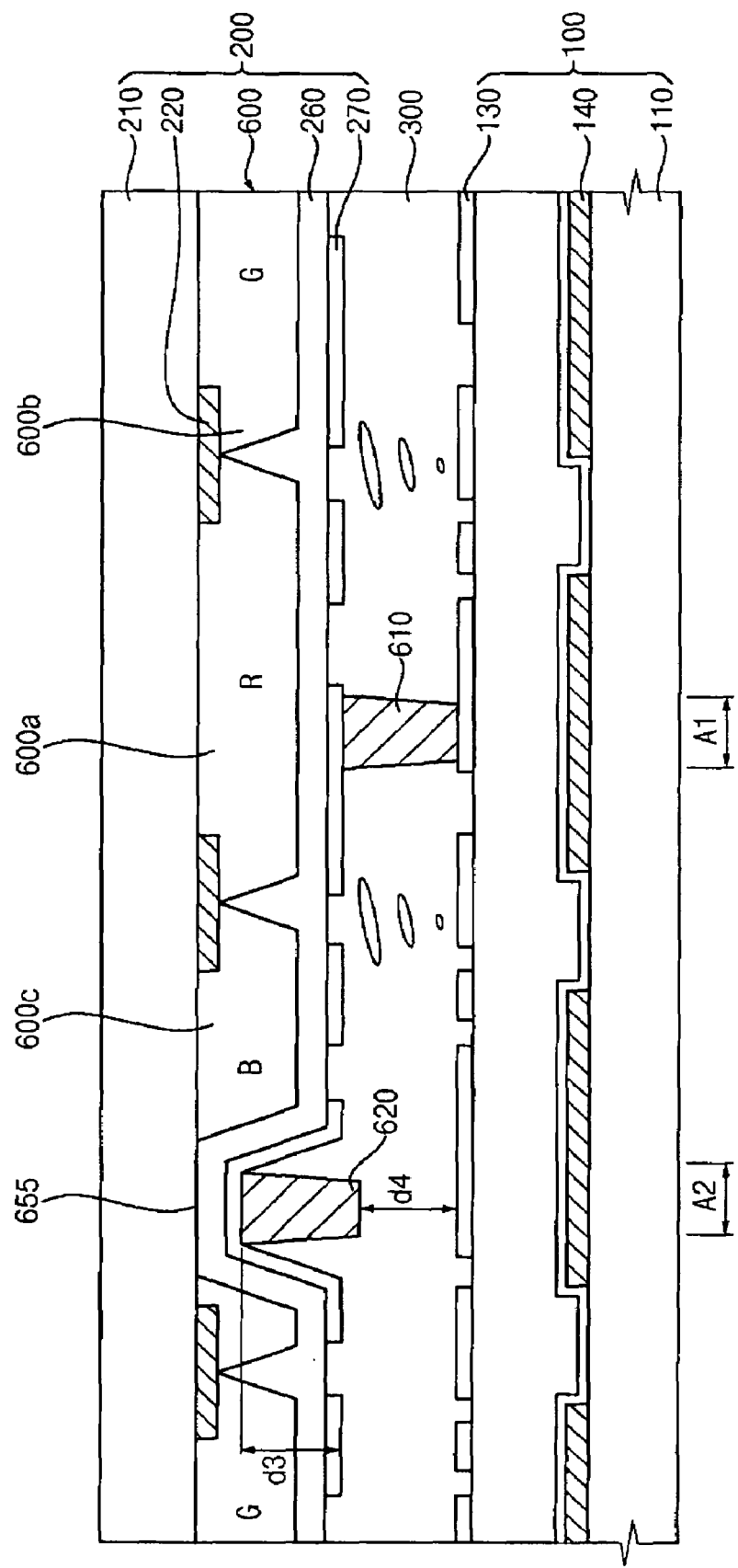
FIG. 6 is a cross-sectional view showing a liquid crystal display device according to another embodiment of the invention.

FIG. 6 is a cross-sectional view illustrating an LCD device according to an embodiment of the invention. The same reference numerals will be used to refer to the same or like parts as those described in FIG. 1 and any further explanation thereof will be omitted.

Referring to FIG. 6, an LCD device includes a lower substrate 100, an upper substrate 200, and a liquid crystal layer 300 interposed therebetween.

The lower substrate 100 includes an effective display area to display an image and an ineffective display area that is adjacent to the effective display area. The effective display area may be divided into a plurality of areas. For example, one area may be where a TFT is formed and another area may be where a storage line 140 is formed.

The upper substrate 200 includes a light-blocking layer 220, a color filter layer 600, a first column spacer 610, and a second column spacer 620. The first column spacer 610 and the second column spacer 620 correspond to the storage line 140. The first column spacer 610 is formed within a first area (A1). The second column spacer 620 is formed within a second area (A2). The first area (A1) and the second area (A2) correspond to the storage line 140.

The first column spacer 610 is a main column spacer maintaining a cell gap between the lower substrate 100 and the upper substrate 200. The second column spacer 620 is a sub column spacer dispersing an external load applied to the liquid crystal display panel to prevent a smear damage. A height of the first column spacer 610 is substantially identical to a height of the second column spacer 620.

The color filter layer 600 includes at least one color pixel. The color pixel may be a red (R) color pixel 600a, a green (G) color pixel 600b or a blue (B) color pixel 600c. The color filter layer 600 has a spacer hole 655. The spacer hole 655 is formed by fully removing a portion of the color pixel that corresponds to the second area (A2). Thus, a second insulation substrate 210 is partially exposed through the spacer hole 655. For example, a portion of the blue (B) color pixel 600c that corresponds to the second area (A2) may be fully removed from the spacer hole 655 such that the second insulation substrate 210 is partially exposed. Alternatively, a portion of the red (R) color pixel 600a that corresponds to the second area (A2), may be fully removed from the spacer hole 655 such that the second insulation substrate 210 is partially exposed. Alternatively, a portion of the green (G) color pixel 600b that corresponds to the second area (A2), may be fully removed from the spacer hole 655 partially exposing the second insulation substrate 210 therethrough.

When the color pixel where the spacer hole 655 is to be formed is formed by patterning a negative photoresist, a light supplied to a portion of the color pixel that corresponds to the second area (A2) may be blocked by a mask. That is, the mask may have a closed portion corresponding to the second area (A2), the closed portion of the mask blocking the light supplied to the portion of the color pixel so that the portion of the color pixel may be fully removed by a subsequent development process. Thus, the spacer hole 655 may be efficiently formed. The second column spacer 620 may be positioned over the spacer hole 655.

An over-coated layer 260 is substantially uniformly formed on the color filter layer 600. A common electrode pattern 270 is then uniformly formed on the over-coated layer 260. Thus, a first portion of the common electrode pattern 270 where the second column spacer 620 corresponds to the second region (A2) may be lower than a second portion of the common electrode pattern 270 where the second portion where the first column spacer 610 corresponds to the first region (A1) is formed.

Because the over-coated layer 260 and the common electrode pattern 270 are substantially uniformly formed on the color filter layer 600, there is a third difference (d3) in height between the first area (A1) where the first column spacer 610 is formed and the second area (A2) where the second column spacer is formed. In addition, there is a fourth difference (d4) in height between the first column spacer 610 formed within the first area (A1) and the second column spacer 620 formed within the first area (A2). The fourth difference (d4) may be substantially identical to the third difference (d3) in height.

As previously described, there is difference (d4) in height between the first column spacer 610 and the second column spacer 620. Thus, when the lower substrate 100 and the upper substrate 200 are combined, the first column spacer 610 may contact the pixel electrode pattern 130 of the lower substrate 100. On the other hand, when the lower substrate 100 and the upper substrate 200 are combined with each other, the second column spacer 620 may be spaced apart from the pixel electrode pattern 130 of the lower substrate 100 such that the second column spacer 620 does not contact the pixel electrode.

In addition, the first column spacer 610 enables a substantially uniform cell gap between the lower substrate 100 and the upper substrate 200. The second column spacer 620 efficiently disperses an external force that is applied to an LCD panel.

The first column spacer 610 and the second column spacer 620 may maintain a substantially uniform cell gap between the lower substrate 100 and the upper substrate 200, which improves a margin of a dropping process and substantially prevents a smear damage.

As previously described above, the portion of the blue (B) color pixel 600c that is positioned within the second area (A2) may be fully removed to form the spacer hole 655. Thus, the third difference (d3) shown in FIG. 6 may be larger than the first difference (d1) shown in FIG. 1. In addition, the fourth difference (d4) shown in FIG. 6 may be larger than the second difference (d2) shown in FIG. 1.

Furthermore, the spacer hole 655 illustrated in FIG. 6 may be more easily formed than the spacer recess 255 illustrated in FIG. 1. In addition, a cell gap of the liquid display device shown in FIG. 6 may be larger than a cell gap of the LCD device shown in FIG. 1 because the fourth difference (d4) may be larger than the second difference (d2). Thus, the LCD device shown in FIG. 6 may efficiently prevent the smear damage.

According to the embodiments of the present invention, a first column spacer is formed over an inwardly recessed portion of a color pixel resulting in there being a difference in height between the first column spacer and the second column spacer.

As a result, the first column spacer may allow a cell gap between the upper substrate and the lower substrate to be substantially uniformly maintained. The second column is spacer may allow an external force to be efficiently dispersed so that a margin of a dropping process may be improved. In addition, a smear damage may be efficiently prevented.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display panel, comprising:
   a first substrate having pixel areas;
   a second substrate facing the first substrate, the second substrate including a color filter layer having a first region and a second region; and
   a plurality of column spacers on the color filter layer, wherein the plurality of column spacers comprises:
      a first member arranged in the first region between the first substrate and the second substrate; and
      a second member arranged in the second region between the first substrate and the second substrate,
   wherein a thickness of the color filter layer in the first region is larger than a thickness of the color filter layer in the second region to position the second member farther away from the first substrate than the first member.

2. The display panel of claim 1, wherein the first substrate comprises:
   a switch device in the pixel area; and
   a storage line forming a storage capacitor to maintain an electrical signal applied to the switch device;
   wherein the storage line corresponds to the first region and the second region.

3. The display panel of claim 1, further comprising:
   a pixel electrode pattern arranged on the first substrate; and
   a common electrode pattern arranged on the second substrate; and
   wherein the pixel electrode pattern faces the common electrode pattern.

4. The display panel of claim 1, wherein the color filter layer comprises a plurality of types of color pixels, and
   wherein the second region is arranged at one of the color pixels, the second region comprising a recessed portion.

5. The display panel of claim 1, wherein the color filter layer comprises a plurality of color pixels, and
   wherein the second region is arranged at one of the color pixels, the second region comprising a hole that partially exposes the second substrate.

6. The display panel of claim 1, further comprising:
   a common electrode pattern arranged over the color filter layer.

7. The display panel of claim 1, wherein:
   the first member maintains a cell gap between the first substrate and the second substrate; and
   the second member absorbs an external force being applied to the first substrate and the second substrate.

8. The display panel of claim 7, wherein the first member and the second member have substantially same height.

9. The display panel of claim 1, wherein the second region comprises a recessed portion and the second member is positioned in the recessed portion.

10. The display panel of claim 1, wherein the second region comprises a hole that partially exposes the second substrate and the second member is positioned in the hole.

11. The display panel of claim 1, wherein the plurality of column spacers have substantially same height, and
   wherein a difference in distance from the first member to the first substrate and from the second member to the first substrate is substantially identical to a difference between the thickness of the color filter layer in the first region and the thickness of the color filter layer in the second region.

* * * * *